US008180107B2

(12) United States Patent
Broaddus et al.

(10) Patent No.: US 8,180,107 B2
(45) Date of Patent: May 15, 2012

(54) ACTIVE COORDINATED TRACKING FOR MULTI-CAMERA SYSTEMS

(75) Inventors: Christopher P. Broaddus, Philadelphia, PA (US); Thomas Germano, Princeton Junction, NJ (US); Nicholas Vandervalk, Franklin Park, NJ (US); Shunguang Wu, Plainsboro, NJ (US); Ajay Divakaran, Monmouth Junction, NJ (US); Harpreet Singh Sawhney, West Windsor, NJ (US)

(73) Assignee: SRI International, Menlo Park, CA (US)

(*) Notice: Subject to any disclaimer, the term of this patent is extended or adjusted under 35 U.S.C. 154(b) by 265 days.

(21) Appl. No.: 12/704,189

(22) Filed: Feb. 11, 2010

(65) Prior Publication Data
US 2010/0208941 A1 Aug. 19, 2010

Related U.S. Application Data

(60) Provisional application No. 61/152,374, filed on Feb. 13, 2009.

(51) Int. Cl.
*G06K 9/00* (2006.01)
*H04N 7/18* (2006.01)

(52) U.S. Cl. ........ 382/103; 382/276; 348/139; 348/143; 348/152

(58) Field of Classification Search ........... 382/100–322
See application file for complete search history.

(56) References Cited

U.S. PATENT DOCUMENTS

| | | | |
|---|---|---|---|
| 6,597,801 B1 * | 7/2003 | Cham et al. | 382/103 |
| 6,683,968 B1 * | 1/2004 | Pavlovic et al. | 382/103 |
| 6,879,705 B1 * | 4/2005 | Tao et al. | 382/103 |
| 6,999,599 B2 * | 2/2006 | Rui et al. | 382/103 |
| 7,035,764 B2 * | 4/2006 | Rui et al. | 702/179 |
| 7,149,325 B2 * | 12/2006 | Pavlidis et al. | 382/103 |
| 7,257,237 B1 * | 8/2007 | Luck et al. | 382/103 |
| 7,596,241 B2 * | 9/2009 | Rittscher et al. | 382/103 |
| 7,623,676 B2 * | 11/2009 | Zhao et al. | 382/103 |

(Continued)

OTHER PUBLICATIONS

Krahnstoever, N.O., Yu, T., Lim, S.N., Patwardhan, K., Tu, P.H., "Collaborative Real-Time Control of Active Cameras in Large-Scale Surveillance Systems," Workshop on Multi-camera and Multi-modal Sensor Fusion Algorithms and Applications, 2008.

(Continued)

*Primary Examiner* — Manav Seth
(74) *Attorney, Agent, or Firm* — Moser Taboada (57) ABSTRACT

A method and system for coordinated tracking of objects is disclosed. A plurality of images is received from a plurality of nodes, each node comprising at least one image capturing device. At least one target in the plurality of images is identified to produce at least one local track corresponding to each of the plurality of nodes having the at least one target in its field of view. The at least one local track corresponding to each of the plurality of nodes is fused according to a multi-hypothesis tracking method to produce at least one fused track corresponding to the at least one target. At least one of the plurality of nodes is assigned to track the at least one target based on minimizing at least one cost function comprising a cost matrix using the k-best algorithm for tracking at least one target for each of the plurality of nodes. The at least one fused track is sent to the at least one of the plurality of nodes assigned to track the at least one target based on the at least one fused track.

25 Claims, 9 Drawing Sheets

U.S. PATENT DOCUMENTS

| | | | | |
|---|---|---|---|---|
| 7,756,296 | B2* | 7/2010 | Porikli et al. | 382/103 |
| 7,932,923 | B2* | 4/2011 | Lipton et al. | 348/143 |
| 2003/0053658 | A1* | 3/2003 | Pavlidis | 382/103 |
| 2003/0053659 | A1* | 3/2003 | Pavlidis et al. | 382/103 |
| 2003/0123703 | A1* | 7/2003 | Pavlidis et al. | 382/103 |
| 2005/0073585 | A1* | 4/2005 | Ettinger et al. | 348/155 |
| 2007/0003141 | A1* | 1/2007 | Rittscher et al. | 382/181 |
| 2008/0101652 | A1* | 5/2008 | Zhao et al. | 382/103 |
| 2009/0231436 | A1* | 9/2009 | Faltesek et al. | 348/169 |
| 2009/0296985 | A1* | 12/2009 | Lv et al. | 382/103 |
| 2009/0304229 | A1* | 12/2009 | Hampapur et al. | 382/103 |
| 2010/0128110 | A1* | 5/2010 | Mavromatis | 348/47 |

OTHER PUBLICATIONS

Faisal Z. Qureshi and Demetri Terzopoulos, "Surveillance Camera Scheduling: A Virtual Vision Approach," Proceedings of the third ACM International Workshop on Video Surveillance & Sensor Networks, 2005.

R. Collins, A. Lipton, H. Fujiyoshi, and T. Kanade, "Algorithms for cooperative multisensor surveillance," Proceedings of the IEEE, vol. 89, No. 10, Oct. 2001, pp. 1456-1477.

Zhang, Z., "A Flexible New Technique for Camera Calibration," IEEE Transactions on Pattern Analysis and Machine Intelligence, 2000.

Nistér, D., "A minimal solution to the generalised 3-point pose problem", Proc. IEEE Computer Society Conference on Computer Vision and Pattern Recognition (CVPR 2004), vol. 1, pp. 560-567, 2004.

T. Fortmann, Y. Bar-Shalom, and M. Scheffe, "Sonar tracking of multiple targets using joint probabilistic data association," IEEE Journal of Oceanic Engineering OE-8, pp. 173-184, Jul. 1983.

L. Hong and Z. Cui, "An interacting multipattern joint probabilistic data association(imp-jpda) algorithm for multitarget tracking," Signal Processing 80, pp. 1561-1575, 2000.

L. Hong and N. Cui, "An interacting multipattern probabilistic data association(imp-pda) algorithm for target tracking," IEEE Trans. on Automatic Control AC-46, pp. 1223-1236, 2001.

* cited by examiner

ACTIVE COORDINATED TRACKING FOR MULTI-CAMERA SYSTEMS

CROSS-REFERENCE TO RELATED APPLICATIONS

This application claims the benefit of U.S. provisional patent application No. 61/152,374 filed Feb. 13, 2009, the disclosure of which is incorporated herein by reference in its entirety.

FIELD OF THE INVENTION

The invention relates generally to vision systems. More specifically, the invention relates to a system and method for automatically controlling a plurality of cameras to track one or more targets and to optimize arbitration and selection of the best available camera for tracking the one or more targets at any given time.

BACKGROUND OF THE INVENTION

There is considerable interest in large camera networks for automatic video analysis in surveillance, training and entertainment in both civilian and military. As the availability of sophisticated hardware increases, the engineering, military, and scientific communities may leverage the capabilities of large camera networks that cover several square kilometers in various applications. For instance, a city may be interested in surveillance during a large event where the attendees significantly outnumber the human security force.

Early attempts at obtaining a global view of targets in a large scale scene have involved cameras with fixed focal length cameras equipped "bug-eye" lenses or mirrors to view the from an overhead position, such as in a stadium. Tracking one or more targets with fixed focal length cameras is difficult to accomplish and produces approximate results at best.

It would be desirable to track targets with variable parameter cameras, such as pan-tilt-zoom (PTZ) cameras. A significant amount of work has been expended in developing algorithms for scheduling PTZ camera resources. Much of this work has been based on master/slave relationships where one PTZ camera is selected as a master camera, and all other PTZ cameras are selected as slaved cameras such as is described in Krahnstoever, N. O., Yu, T., Lim, S. N., Patwardhan, K., Tu, P. H., "Collaborative Real-Time Control of Active Cameras in Large-Scale Surveillance Systems," *Workshop on Multi-camera and Multi-modal Sensor Fusion Algorithms and Applications*, 2008, Faisal Z. Qureshi and Demetri Terzopoulos, "Surveillance Camera Scheduling: A Virtual Vision Approach," *Proceedings of the third ACM International Workshop on Video Surveillance & Sensor Networks*, 2005, and R. Collins, A. Lipton, H. Fujiyoshi, and T. Kanade, "Algorithms for cooperative multisensor surveillance," *Proceedings of the IEEE*, Vol. 89, No. 10, October, 2001, pp. 1456-1477. Movable PTZ cameras have time-varying fields of view, which makes single PTZ camera tracking more challenging than for fixed cameras. Moreover, active coordination of PTZ cameras requires dynamic optimization of camera coverage when the camera coverage is itself a time-varying function. In the case of systems employing PTZ cameras having a single master and a plurality of slaves, if a target that is initially visible to a master becomes visible only to the slave camera and not to the master camera, the master does not know how next to command the slave camera to track the target.

Accordingly, what would be desirable, but has not yet been provided, is a system and method for effective and automatic control of a plurality of PTZ and possibly fixed cameras for tracking one or more targets and to optimize arbitration and selection of the best available camera for tracking the one or more targets at any given time.

SUMMARY OF THE INVENTION

The above-described problems are addressed and a technical solution achieved in the art by providing a method and system for coordinated tracking of objects, the method being executed by at least one processor, comprising the steps of: receiving a plurality of images from a plurality of nodes; identifying the at least one target in the plurality of images to produce at least one local track corresponding to each of the plurality of nodes having the at least one target in its field of view; fusing the at least one local track corresponding to each of the plurality of nodes according to a multi-hypothesis tracking method to produce at least one fused track corresponding to the at least one target; assigning at least one of the plurality of nodes to track the at least one target based on minimizing at least one cost function for tracking at least one target for each of the plurality of nodes; and sending the at least one fused track to the at least one of the plurality of nodes assigned to track the at least one target based on the at least one fused track. Minimizing the cost function corresponds to minimizing an N×M cost matrix C, wherein at least one sensor is assigned to the at least one node, wherein M and N are the number of targets and the number of sensors, respectively, and wherein the cost matrix is minimized using the k-best algorithm to find the best sensor to task assignment, wherein a task represents one target.

Each of the elements of the cost matrix $C_{ij} = V_{ij} + D_{ij} + O_{ij} + W_{ij}$, wherein $V_{ij}$ is a measure between $[0,1]$ indicating whether an associated geographic location of a task j is visible to a sensor i, wherein j is greater than or equal to 1 and i is greater than or equal to 2, wherein $D_{ij}$ is a measure between $[0,1]$ indicating the cost for the task i to follow a location of the sensor j, wherein $O_{ij}$ is a measure between $[0,1]$ indicating whether moving objects associated with task j are being observed by sensor i, and wherein $W_{ij}$ is measure between $[0,1]$ indicating the cost for sensor i to follow task j. Minimizing the cost matrix may be subject to a constraint of an N×M forbidden matrix, F, wherein the forbidden matrix is based on a sensor state, the sensor state being a binary measure (0 or 1) indicating whether sensor i is available for assignment to follow a task j, wherein the assignment is forbidden.

According to an embodiment of the present invention, the method may further comprise employing a plurality of sensors to observe the same target using a k-redundancy method, wherein k is the maximum number sensors that are assigned to a task, wherein the k-redundancy method comprises the steps of, for each of the k sensors, generating the cost matrix for all untasked sensors in an untasked pool; solving the cost matrix using the k-best algorithm; and assigning each sensor to its best task and remove the sensors from the untasked pool, wherein a task represents one target, and wherein number of rows in the cost matrix is reduced for each step less than or equal to the number of tasks.

According to an embodiment of the present invention, the at least one node comprises at least one image capturing device. The at least one image capturing device comprises at least one of a pan-tilt-zoom (PTZ) camera, a fixed camera, a GPS device, an AIS device, and a radar-based device.

According to an embodiment of the present invention, a PTZ camera may be configured to track more than one target per task. The more than one target are grouped into clusters according to the K-means clustering algorithm. Each of the clusters is labeled as tasks, and wherein the cost function is minimized with clusters substituted for tasks.

According to an embodiment of the present invention, the multi-hypothesis tracking method may be the simplified joint probabilistic data association method.

BRIEF DESCRIPTION OF THE DRAWINGS

The present invention may be more readily understood from the detailed description of an exemplary embodiment presented below considered in conjunction with the attached drawings and in which like reference numerals refer to similar elements and in which.

It is to be understood that the attached drawings are for purposes of illustrating the concepts of the invention and may not be to scale.

DETAILED DESCRIPTION OF THE INVENTION

Figure 1:
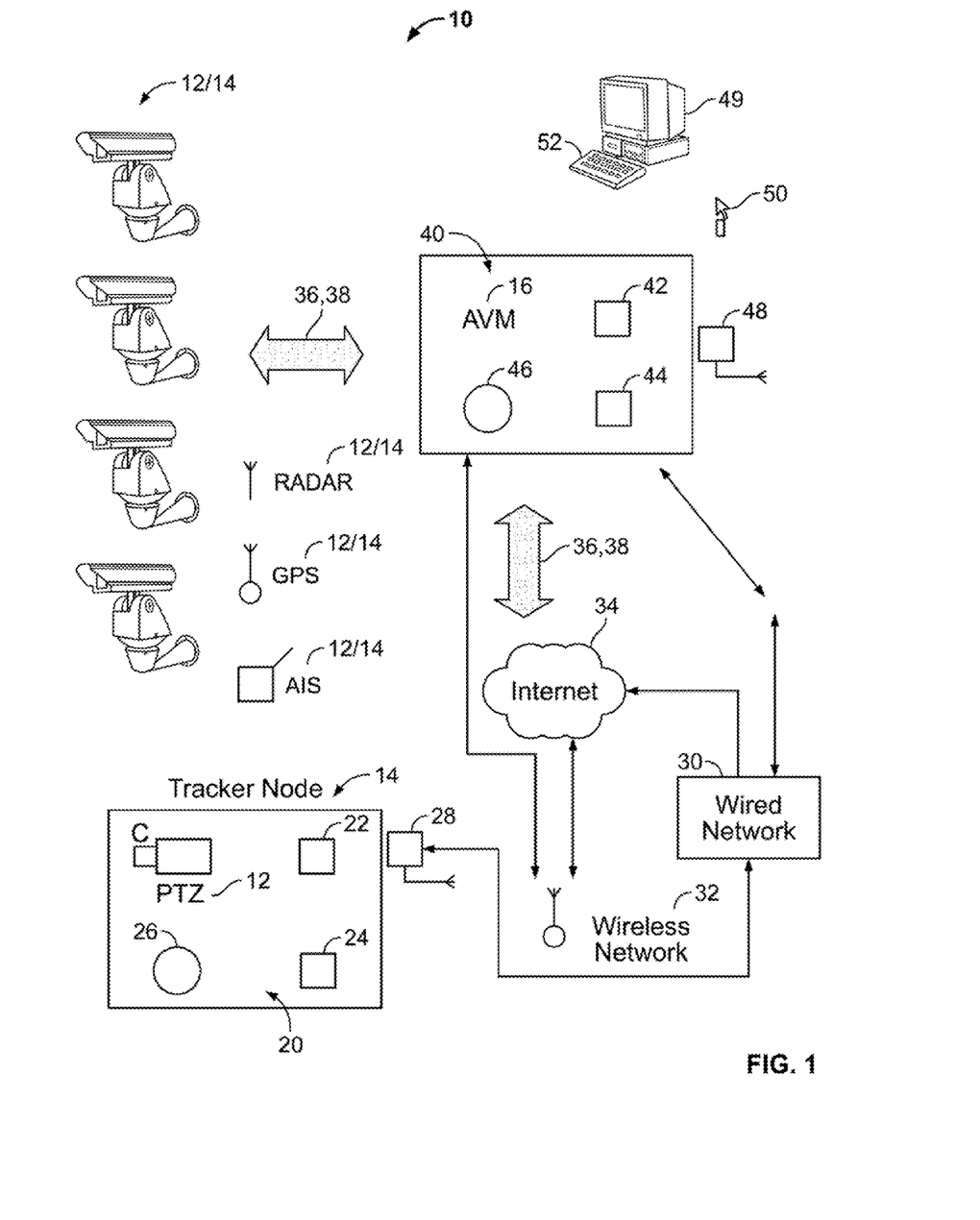
FIG. 1 illustrates an exemplary hardware architecture of an active collaborative tracking (ACT-vision) system for coordinated tracking of objects, according to an embodiment of the present invention.

FIG. 1 illustrates an exemplary hardware architecture of an active collaborative tracking (ACT-vision) system 10 for coordinated tracking of objects, according to an embodiment of the present invention. The ACT-vision system 10 is configured to automatically control a plurality of individual PTZ cameras to follow a particular target, or a set of targets, to optimize arbitration among the PTZ cameras, and to optimize PTZ camera-to-PTZ camera handoff for determining which PTZ camera(s) is the best camera(s) for tracking and maintaining focus upon one or more targets. The goal of the present invention is to optimize sensor assignment to obtain the best quality coverage of one or more targets given the availability of one or more sensors.

According to an embodiment of the present invention, a strategy for tracking and maintaining targets in view assumes each camera is or can be modeled as a PTZ camera, i.e., a fixed camera may be thought of as a PTZ camera with a fixed location and fixed PTZ components.

The ACT-vision system 10 is essentially a real-time operating system that can control hundreds of PTZ cameras to ensure uninterrupted tracking of target objects while maintaining image quality and coverage of all targets using a minimal number of sensors. The system ensures the visibility of targets between PTZ cameras by using criteria such as distance from sensor and occlusion. The ACT-vision system 10 comprises a network of pan-tilt-zoom (PTZ) cameras and GPS sensors in a single connected region to maintain visibility of designated targets. The network of PTZ cameras operates as a single connected system to provide persistent visibility of targets between PTZ camera views. The system optimizes the cost based assignment of cameras to targets using criteria such as pixels on target, visibility based on a geometric model, and also minimizes camera switching.

The ACT-vision system 10 comprises two primary components: a plurality of tracker nodes 14 and an ACT-vision manager (AVM) 16. Each tracker node 14 comprises at least one image capturing device 12, which, in a preferred embodiment, may be a PTZ camera. According to an embodiment of the present invention, the image capturing device (i.e. a sensor) 12 may be, but is not limited to, a PTZ camera, a fixed camera, a global positioning system (GPS), an automatic identification system (AIS), or radar. Although embodiments of the present invention apply to a variety of types of image capturing devices, further reference will be made to PTZ cameras.

The image capturing device 12 may be controlled by a computing platform 20, which may include at least one single or multicore processor 22, one or more computer readable media 24, such as flash ROM, RAM, an optical device 26, such as a CD, DVD, Blue Ray DVD, etc., and a network interface 28 for communicating to and from the AVM 16 over a wired LAN or WAN network 30, or over a wireless network 32, using wireless protocols such a WIFI, Bluetooth, cellular protocols, or other radio protocols. The wired or wireless network may include the Internet 34. The tracker node 14 is configured to output one or more local tracks 36 from one or more targets detected by the image capturing device 12, and is configured to receive one or more global tracks 38 from the AVM 16 to be described hereinbelow.

The AVM 16 comprises a computing platform 40, which may include at least one single or multicore processor 42, one or more computer readable media 44, such as flash ROM, RAM, an optical device 46, such as a CD, DVD, Blue-Ray DVD, etc., a plurality of network interfaces 48 for communicating with each of the tracker nodes 14 over the wired or wireless network 30, 32, which may include the Internet 34. The AVM 16 may be equipped with a monitor 49 for displaying targets to be tracked, and a mouse 50 and a keyboard 52 for user input, such as the manual selection of one or more targets to be tracked. This allows an operator from a visualization GUI displayed on the monitor 48 of the AVM 16 to select a single target, or a collection of targets, with the mouse 50 which relays this information to the AVM 16.

The AVM 16 is responsible for tasking the tracker nodes 14 to follow one or more targets. The AVM 16 is configured to automatically control individual PTZ cameras 12 to follow a particular target, or a set of targets, and to optimize the arbitration of N PTZ cameras 12 to maintain visibility. The AVM 16 receives is configured to receive more of the local tracks 36 from the tracker nodes 14, and is configured to send one or more global tracks 38 to the Tracker nodes 14 over wired or wireless network 30, 32, 34.

In addition to receiving local video tracks 36 from the tracker nodes 14, the AVM 16 is configured to receive data (local tracks 54) from a GPS 56, AIS 58, or radar 60 from GPS/AIS/radar-based tracker nodes 14 to improve the accuracy of data obtained from one or more PTZ cameras 12 observing the same scene. The AVM 16 has a high-level interface for communicating with the tracker nodes 14 to initiate tracking of object which comprises three commands: 1) "Track object X detected in Camera Y", 2) "Track object at WGS-84 location XYZ" and 3) "Track unique target identifier X". The last command assumes that the AVM 16 has knowledge of a GPS 56 mounted on a soldier or vehicle, an AIS 58 mounted on a vessel in a maritime application, or tracks from radar 60. This provides the AVM 16 with a simple interface in applications where video analytics is the primary source of the local tracks 36, but the AVM 16 is adaptable to environments with GPS 56, AIS 58, or radar 60. The AVM 16 records the location and appearance information of the selected targets, or a unique GPS/AIS/radar identifier if available, and automatically hands-off the target from PTZ camera to PTZ camera as needed.

According to an alternative embodiment of the present invention, selection of one or more target(s) may be carried out automatically based on a triggering mechanism driven by audio-visual event detection by the AVM 16, by one or more of the tracker nodes 14, or by a stand alone event detector (not shown).

According to an embodiment of the present invention, if sufficiently powerful computing resources are available, the computing platform 20 of each of the tracker nodes 14 may be incorporated into the computing platform 40 of the AVM 16 under the control of one or more single or multi-core processors.

Figure 2:
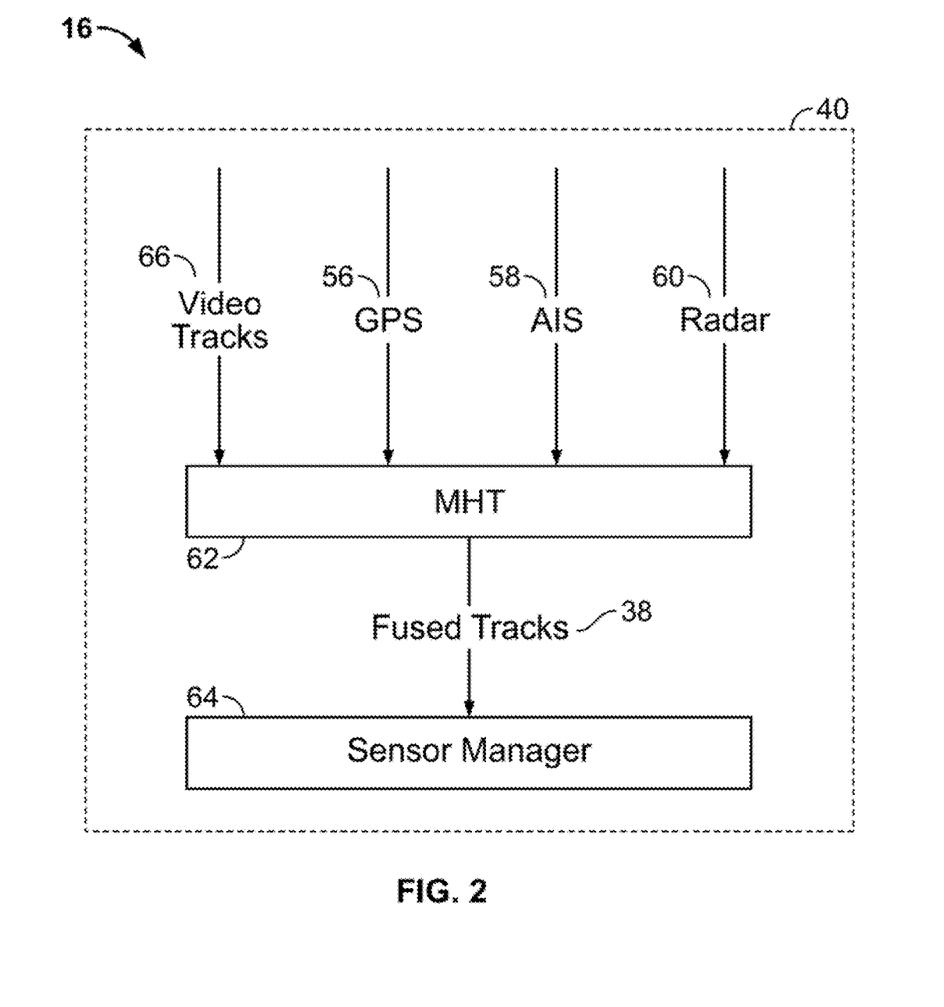
FIG. 2 is a block diagram of software modules implemented in an ACT-vision manager (AVM) and data flow through the AVM, according to an embodiment of the present invention.

FIG. 2 is a block diagram of the software modules that are implemented in the AVM 16 and the flow of data through the AVM 16. Referring now to FIG. 2, the computing platform 40 of the AVM 16 implements a multi-hypothesis tracker (MHT) module 62 and a sensor manager module 64. The MHT module 62 ingests individual detections or local tracks 36 from varying sources 56, 58, 60, 66, and outputs the fused tracks 38. The sensor manager module 64 receives the fused tracks 38 and solves a sensor assignment problem. Solving the sensor assignment problem involves performing a cost based calculation to optimize the task of PTZ assignment to one or more targets, and the hand-off from PTZ to PTZ camera to be described hereinbelow.

Figure 3:
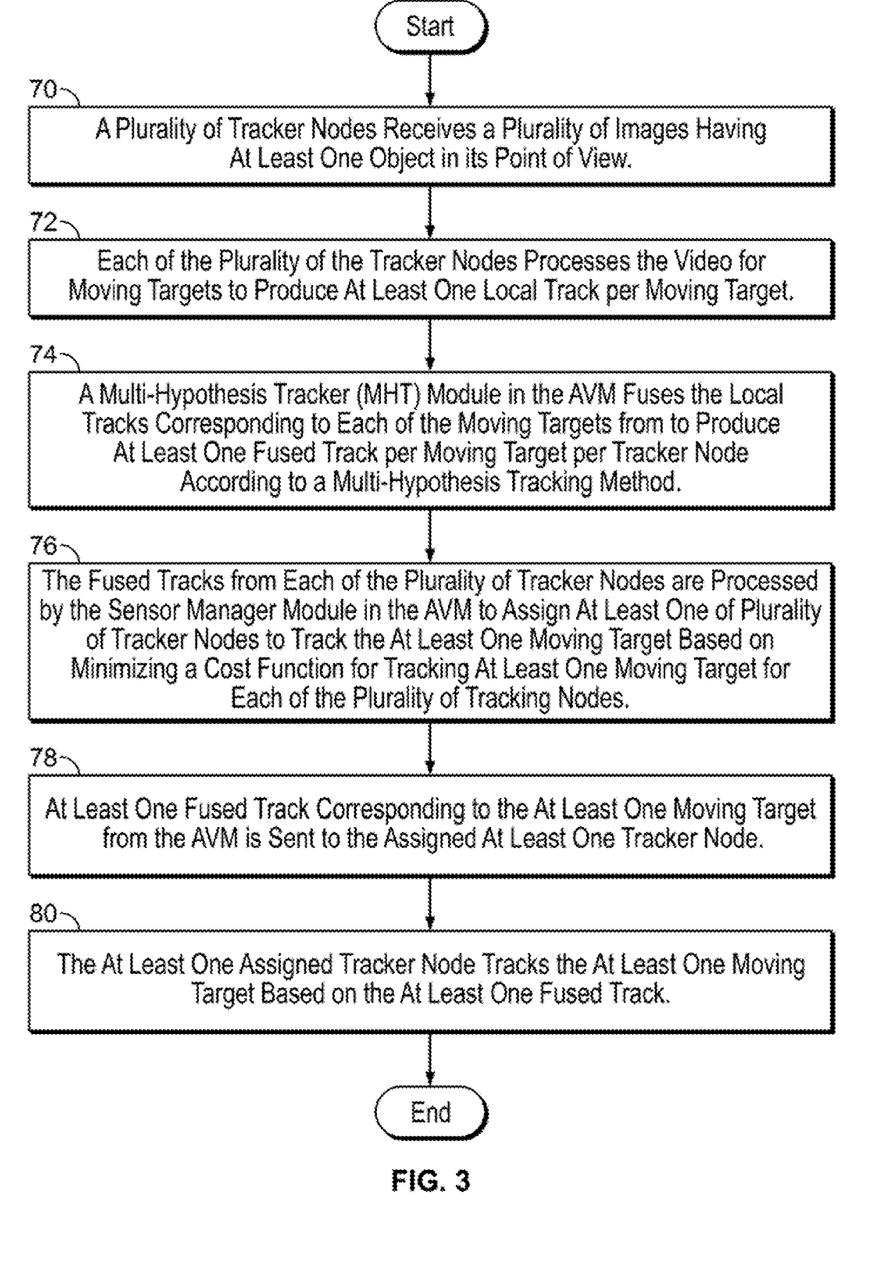
FIG. 3 is a process flow diagram illustrating exemplary modules/steps for coordinated tracking of objects, according to an embodiment of the present invention.

FIG. 3 is a process flow diagram illustrating exemplary modules/steps for coordinated tracking of objects, according to an embodiment of the present invention. Referring now to FIGS. 1-3, at step 70, a plurality of tracker nodes 14 receives a plurality of images of video having at least one object in its field of view taken by its respective image capturing device(s) 12. In addition to video, each of the tracker nodes 14 is configured to receive PTZ telemetry and GPS information, if available. The PTZ telemetry contains metadata of the image capturing device 12 which may include intrinsic and extrinsic parameters in geospatial coordinates. At step 72, each of the plurality of the tracker nodes 14 processes the video for moving targets, classifies at least one moving target as human or non-human, locates the moving target(s) in WGS-84 geospatial coordinates, and tracks the at least one moving target using appearance and kinematic information to produce at least one local track 36. At step 74, a multi-hypothesis tracker (MHT) module in the AVM 16 fuses the local tracks corresponding to each of the moving targets from to produce at least one fused track per moving target per tracker node 14 according to a multi-hypothesis tracking method, such as a joint probabilistic data association (JPDA) method to be described hereinbelow. At step 76, the fused tracks from each of the plurality of tracker nodes 14 are processed by the sensor manager module 64 in the AVM 16 to assign at least one of plurality of tracker nodes 14 to track the at least one moving target based on minimizing a cost function for tracking at least one moving target for each of the plurality of tracking nodes to be described hereinbelow. At step 78, at least one fused track 38 corresponding to the at least one moving target from the AVM 16 is sent to the assigned at least one tracker node 14. At step 80, the at least one assigned tracker node 14 tracks the at least one moving target based on the at least one fused track.

According to an embodiment of the present invention, the sensor manager module 64 may alternatively direct one or more tracker nodes 14 to adjusting intrinsic or extrinsic parameters associated with the one or more image capturing devices 12, such as changing the zoom, pan, or tilt of a PTZ camera.

Note that in principle, tracking may be achieved using GPS or even some other method and the ACT-vision system 10 may still be used to track the at least one target, i.e., maintain visibility. In practice, that would require a good refresh rate for the GPS, i.e., better than 5 Hz and good spatial accuracy as well. Such GPS tags are not infeasible, but not always available.

The camera calibration procedure for the image capturing devices 12 estimates camera parameters for mapping 3D points in world space to 2D image coordinates in an image. There are two aspects to the calibration procedure, namely an intrinsic and extrinsic calibration: intrinsic calibration referring to the calibration of parameters of the camera such as focal length, etc., while extrinsic calibration refers to calibration of a camera relative to its location in space or a scene, such as its pose in absolute space coordinates. In monocular cameras, the intrinsic and extrinsic calibratable components are physically independent. In the ACT-vision system 10, PTZ cameras 12 may be used that vary their pan, tilt and focal length axes. The intrinsic parameters of these types of cameras may change as the focal length axis changes, and depending on the application, need a complete model for accurate measurements. According to an embodiment of the present invention, intrinsic parameters such as focal length, aspect ratio, skew, principal point and radial distortion components are estimated at discrete zoom factors. Polynomial interpolation is then applied to the discrete zoom factors to fill in gaps, as described in Zhang, Z., "A Flexible New Technique for Camera Calibration," *IEEE transactions on Pattern Analysis and Machine Intelligence*, 2000. This technique is applied offline and loaded by the ACT-vision system 10.

The extrinsic parameters are estimated by sighting landmarks visible to the PTZ camera 12 with known 3D locations. The 3D locations, measured using GPS or LIDAR, and the corresponding PTZ values are used to compute the platform location and orientation. Extrinsic parameter are estimated in two stages. The first stage of the extrinsic calibration procedure is based on the 3-Point Algorithm to find an initial estimate of the location and orientation of the PTZ camera platform as described in Nistér, D., "A minimal solution to the generalised 3-point pose problem", *Proc. IEEE Computer Society Conference on Computer Vision and Pattern Recognition (CVPR* 2004), Volume 1, pages 560-567, 2004. A minimum of four points is used to find a unique solution, and for a large number of correspondences, the 3-Point Algorithm is applied in conjunction with RANSAC to find the best initial estimate. The second stage is non-linear optimization which uses the initial estimate and measurement uncertainty of the correspondences to minimize reprojection error.

Detection and tracking of moving targets from a moving platform (either aerial or a PTZ camera) is challenging for cameras because it is difficult to separate the target motion from the sensor-induced motion in image frames taken by a camera. The traditional approach is to perform image stabilization to compensate for the sensor motion, and to perform change detection on the stabilized image frames. A parametric (affine or projective) background motion model is usually assumed in image stabilization, which is only valid when the scene is planar or the sensor undergoes rotational motion. Background stabilization may fail when the moving object occupies a large portion of the image.

Figure 4:
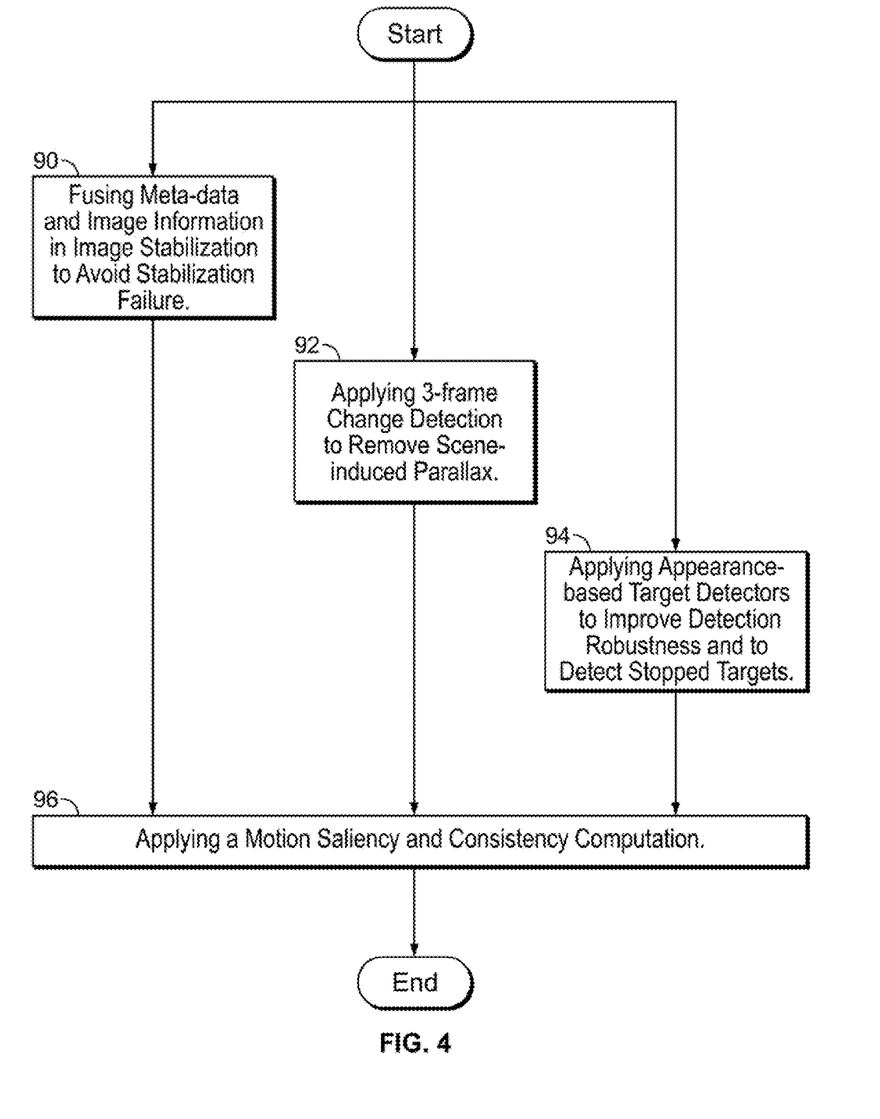
FIG. 4 is a process flow diagram illustrating exemplary steps for image stabilization, according to an embodiment of the present invention.
Figure 5A:
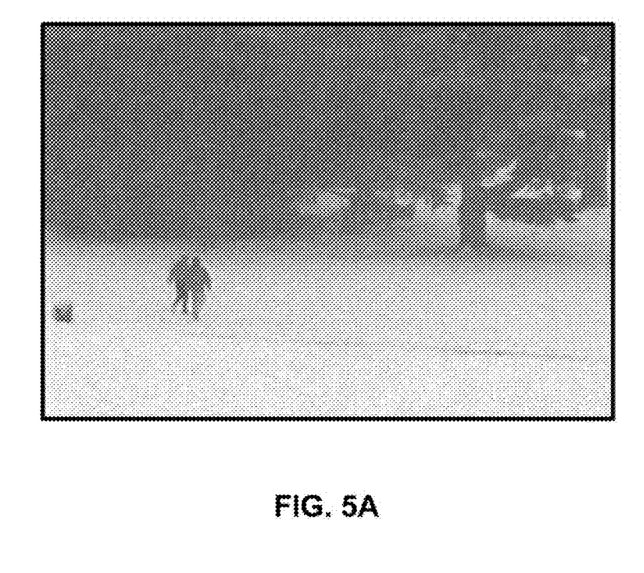
FIG. 5A shows an illustration of a motion detection example from a static background.
Figure 5B:
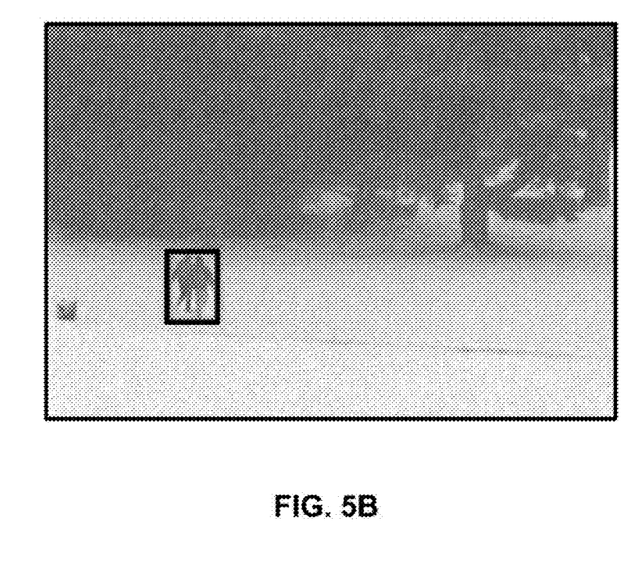
FIG. 5B shows an illustration of a motion detection example from a PTZ camera that has been image stabilized using the method of FIG. 4.

According to an embodiment of the present invention, the above mentioned obstacles are mitigated using a combination of image stabilization techniques illustrated in the flow diagram of FIG. 4, including at least one of the following: 1) fusing, in step 90, meta-data and image information in image stabilization to avoid stabilization failure; 2) applying, in step 92, 3-frame change detection to remove scene-induced parallax; 3) applying, in step 94, appearance-based target detectors to improve detection robustness and to detect stopped targets; and 4) applying, in step 96, a motion saliency and consistency computation with the results from steps 1-3 (steps 90-94), so as to establish the identity of a detected moving object across multiple frames as well as to eliminate background clutter such as swaying trees. These techniques run in real-time or near real-time, which is necessary for the scale and volume of data expected for persistent surveillance. A motion detection example from a static background is shown in FIG. 5A, and a FIG. 5B shows an illustration of a motion detection example from a PTZ camera that has been image stabilized using the method of FIG. 4.

Figure 6:
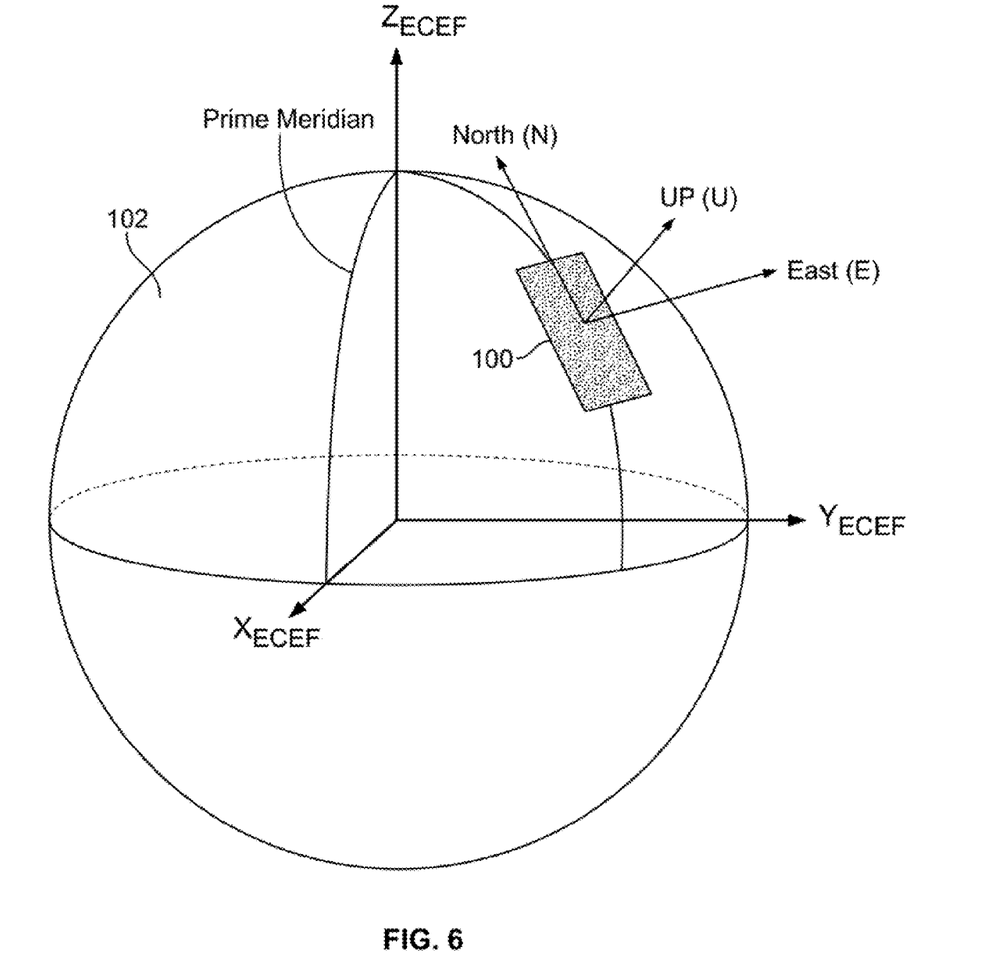
FIG. 6 is an illustration of a model for estimating of the terrain viewed by a PTZ camera with a plane tangent to a WGS-84 ellipsoid.

The PTZ cameras 12 in the ACT-vision system 10 are calibrated in geospatial coordinates. This implies that the location of platform in WGS-84 coordinates is available, and the orientation of the platform with respect to a fixed geospatial reference frame, i.e., Earth-Center-Earth-Fixed (ECEF) or local Easting-Northing-Up (ENU) is available. When an object is detected in a tracker node 14, PTZ telemetry information is used to map the object to WGS-84 coordinates using ray tracing techniques. With any ray tracing technique a surface is needed for an approximation of the local terrain. The terrain may be modeled with a plane, ellipsoid, elevation map, or more sophisticated techniques that exploit LIDAR data. In most urban or geographical regions with a small variance in elevation, a plane tangent to the WGS-84 ellipsoid translated at the correct altitude and positioned directly below the camera is usually sufficient in modeling a local region as shown in FIG. 6. FIG. 6 is an illustration of a model for estimating of the terrain viewed by a PTZ camera 12 with a plane 100 tangent to a WGS-84 ellipsoid 102. The plane 100 is translated to the estimate altitude based on sampling the elevation surrounding the camera 12. Tests have shown a standard deviation of the altitude of less than 1 meter.

The multi-hypothesis tracker (MHT) method employed in the ACT-vision system 10 is the simplified joint probabilistic data association (JPDA) method applied to multi-sensor multi-targets configurations as described in at least one of T. Fortmann, Y. Bar-Shalom, and M. Scheffe, "Sonar tracking of multiple targets using joint probabilistic data association," *IEEE Journal of Oceanic Engineering* OE-8, pp. 173-184, July 1983, L. Hong and Z. Cui, "An interacting multipattern joint probabilistic dard association(imp-jpda) algorithm for multitarget tracking," *Signal Processing* 80, pp. 1561-1575, 2000, and L. Hong and N. Cui, "An interacting multipattern probabilistic data association(imp-pda) algorithm for target tracking," *IEEE Trans. on Automatic Control* AC-46, pp. 1223-1236, 2001. This algorithm runs in real-time for 100's of PTZ cameras 12 and targets. The JPDA method associates the local tracks 36 from each PTZ camera, GPS, AIS and radar using a constant velocity kinematic model in geographical coordinates, and shape and appearance information from acquired images. The targets that are detected by the Tracker node 14 contain the WGS-84 location along with an Easting-Northing-Up (ENU) error covariance. If the targets are detected from PTZ cameras 14, as opposed to GPS, then the shape and appearance information are extracted from target pixels. The above described framework manages target splitting, merging and the target life cycle.

In the process of determining a cost for each detected track to be described hereinbelow, it is desirable to account for occlusions. To this effect, an occlusion map is generated. The occlusion map, or visibility map, takes a 3D point in geometric model space and a camera identifier and returns the visibility ratio of a volume centered at the 3D point. The volume represents the uncertainty in the locality of the 3D point, and can take the form of a geometric primitive such as an ellipsoid. The returned value is the percentage of the volume that is visible to the PTZ camera 12. The ratio is computed by sampling the volume and determining the percentage of points that are in the viewing volume of a PTZ camera 12 via the calibration parameters. The viewing volume of the PTZ camera 12 is pre-computed and stored for fast indexing based on 3D locality.

Figure 7:
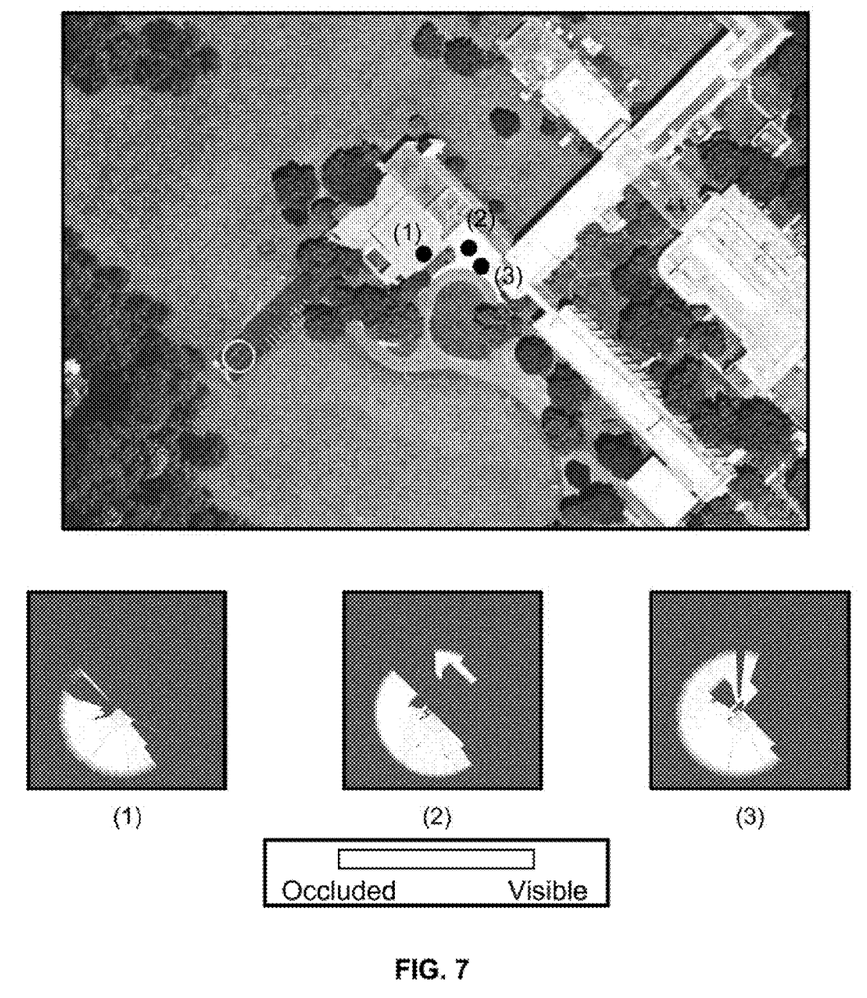
FIG. 7 illustrates an example of the occlusion map output for three PTZ cameras and a snapshot of the occlusion map rendered as an image.

FIG. 7 illustrates an example of the occlusion map output for three PTZ cameras 14 and a snapshot of the occlusion map rendered as an image. Since the occlusion map is represented in three-dimensional space, visibility is profiled at a certain altitude and rendered as an image. The 3D model shown in FIG. 7 is the Sarnoff Corporation Campus with three PTZ cameras installed on a side or the top of the building. The black and white rendered images are generated by taking a profile of the 3D occlusion representation. The area shaded black is considered non-visible to a PTZ camera.

A first metric used for assignment of a PTZ camera 14 (sensor) to follow a target (task) is a sensor state. The sensor state is a binary measure (0 or 1) indicating whether sensor i is available for assignment to follow task j. This is can be used for administrative purposes since an operator may choose to acquire a PTZ camera with a joystick for manual operation, or $3^{rd}$ part applications coexist in the system. This is separated from the cost because the assignment is forbidden, and should not be considered. This is the purpose of the Forbidden Matrix $F_{ij}$ which indicates sensor i is available to follow task j if the value is 1, and zero otherwise.

As described in step 76 of FIG. 3, the fused tracks are processed by a sensor manager module 64 which notifies the tracker nodes 14 to optimize coverage of the tracked object(s) according to a cost function. The cost function is based on minimizing a second metric, i.e., a cost matrix, C, whose elements, $C_{ij}$, represent the cost which the AVM 16 computes for a PTZ camera 12 (sensor) to follow a target based on the following functions where a task represents one target. The total cost for sensor i to follow task j is $$C_{ij}=V_{ij}+D_{ij}+O_{ij}+W_{ij}$$

There are two matrices: the N×M cost matrix C and the N×M Forbidden Matrix F, where N is the number of sensors (i.e. image capturing devices) and M is the number of targets. The parameters, $V_{ij}$, $D_{ij}$, $O_{ij}$, and $W_{ij}$ are defined as follows:

Visibility $V_{ij}$: This is a measure between [0,1] indicating whether the associated geographic location of task j is visible to sensor i. The visibility is estimated based on prior knowledge of the scene, i.e., a 3D model. Since there is uncertainty in the target location the measure is not a binary measure, rather a probability of visibility. If the visibility is less than σ then it is safe to assume the location is not visible and the corresponding value in the Forbidden Matrix should be set to zero. This ensures the assignment will not be made.

Distance $D_{ij}$: This is a measure between [0,1] indicating the cost for sensor i to follow location of task j, based on pixels on a target (roughly equivalent to distance from a target). Linear scaling is usually sufficient. However, non-linear distributions may be advantageous in certain applications.

Observer $O_{ij}$: This is a measure between [0,1] indicating whether the targets associated with task j are being observed by sensor i. This cost ensures that a sensor that is already observing a track is weighted, i.e. favored, more than a non-observer. For example, a sensor that can see a GPS track at the current time it should be weighted more than a sensor that has to manipulate its pan, tilt and zoom motors to see the target.

Switch $W_{ij}$: This is measure between [0,1] indicating the cost for sensor i to follow task j which is already being followed by another sensor. This implies that the cost will be zero if this track is not currently being followed by another sensor. The importance of this cost is to ensure that assignment oscillation does not occur when two or more sensors are competing for a task.

The cost matrix, C, is minimized using the k-best algorithm to find the best sensor to task assignment subject to the constraint of the Forbidden Matrix, F.

There are two optimization strategies that have been developed to accommodate different uses of the PTZ cameras 12: 1) use the minimum number of PTZ cameras to maintain visibility of a target, and 2) encourage multiple views of the same target from different PTZ cameras. The first strategy implies that not all available sensors will be fully utilized in the system which may be acceptable, since if the sensor is busy following a target it is not covering a region which may be of interest for generating alarms. Also, it may increase the lifespan of the mechanical components of a PTZ camera 12 in some applications. The second strategy encourages multiple views of the same target to reduce the risk of losing the target due to poor detection or occlusion. This strategy may also be used in 3D reconstruction where multiple camera viewpoints may reduce the measurement error. This is called k-redundancy where k is the maximum number sensors that may be assigned to a task.

The sensors are assigned using the following algorithm:
1) FOR 1:k
2) Generate the cost matrix for all untasked sensors in an untasked pool;
3) Solve cost matrix using the k-best algorithm;
4) Assign each sensor to its best task and remove the sensors from the untasked pool;
5) END This is an iterative algorithm which requires solving a cost matrix k times. The number of rows in the cost matrix is reduced for each step less than or equal to the number of tasks.

According to an embodiment of the present invention, a PTZ camera 12 may be configured to track more than one target per task. Employing a PTZ camera 12 to track a single target has some significant limitations. For example, consider a system having two PTZ cameras and five targets. If a PTZ camera 12 is restricted to follow one target at a time, then at most two of the five targets may be followed. It is advantageous to have a technique for follow a set of targets with a single PTZ camera 12, known as group tasking.

Figure 8:
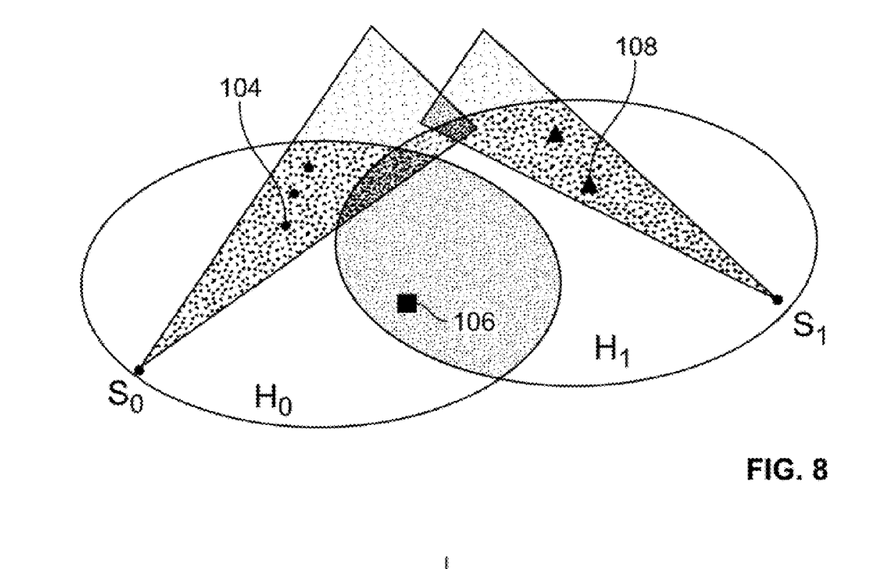
FIG. 8 illustrates a configuration of PTZ cameras and tracks within clusters for tracking multiple targets, according to an embodiment of the present invention.

FIG. 8 illustrates a configuration of PTZ cameras 12 and tracks within clusters for tracking multiple targets, according to an embodiment of the present invention. There are two PTZ cameras labeled $S_0$ and $S_1$ and three clusters 104, 106, 108 depicted as circles, squares and triangle, respectively. The candidate assignments are restricted to the partitions $H_0$ and $H_1$. This permits ACT-vision system 10 to follow a group of targets with a single PTZ camera 12 and thus frees other PTZ cameras 12 for other tasks.

The AVM 16 accomplishes this by clustering targets together into a group and considering the cluster in the above sensor tasking operation. The K-Means Clustering algorithm is used to find clusters in the track pool, and each of the clusters is labeled as tasks. The method described above for minimizing a cost matrix is followed with clusters substituted for tasks.

Figure 9:
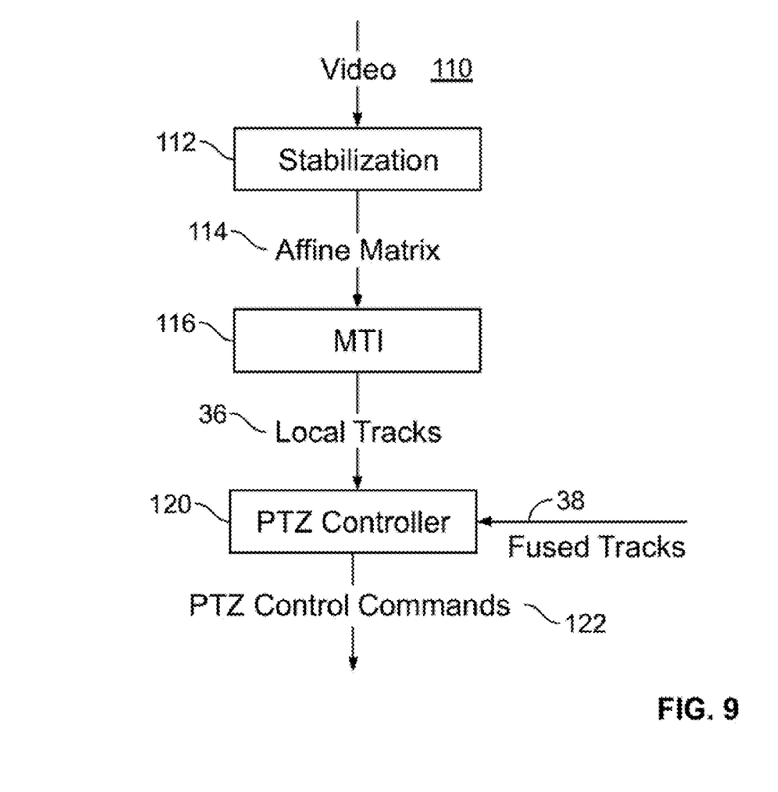
FIG. 9 depicts a block diagram of major modules implemented by the computing platform a tracker node of FIG. 1 and a data flow pipeline between the modules, according to an embodiment of the present invention.

FIG. 9 depicts a block diagram of major modules implemented by the computing platform 20 of the tracker node 14 of FIG. 1 and a data flow pipeline between the modules, according to an embodiment of the present invention. The captured video (images) 110 is stabilized by a stabilization module 112 and placed into an affine matrix 114, moving targets are detected in the affine matrix 114 and tracked by a moving target indication (MTI) module 116 to produce local tracks 36 (The MTI module 116 assumes that if a camera is directed to observe a particular location, then an object located at that location should be the object to be tracked). The local tracks 36 are sent to a PTZ Controller (module) 120. The PTZ Controller 120 also receives fused tracks 38 from the MHT module 62 of the AVM 16 of FIG. 2 and generates control commands 122. The PTZ controller 120 determines the control command to issue to the PTZ camera 12 as to keep the target or collection of targets in the field-of-view (FOV).

Referring now to FIGS. 2 and 9, the local tracks 36 have low latency since the PTZ controller 120 is an inline module running on the Tracker node 14, and the fused tracks 38 have a fixed delay from MHT module 62. If the MHT module 62 is running on separate computing hardware, then the network latency would be an additional delay. When the AVM 16 makes a sensor assignment based on the minimum cost, it makes a TRACK-OBJECT(GLOBAL_ID) function call. The global ID of the local track 36 is maintained by the MHT module 62 running on AVM 16. The fused track 38 that MHT module 62 output contains the global ID, fused track 38 and all the local tracks 36 that contributed to it. The following elaborates on the differences between a local and fused track, 36, 38, respectively.

Local track—the track that is produced by the MTI module 116 running on the Tracker node 14 containing a local ID, source ID, 2D appearance information and geographical location. The source ID determines the type of sensor; such as video analytics, GPS, AIS or radar. The local ID is a 64-bit number that encodes the sensor ID in the MSB 32-bits, and the local track ID in the LSB 32-bits. This makes the local ID a unique number across the entire system 10.

Fused track—the track that MHT module 50 generates which contains a global ID, representative fused track 38 estimated from all measurements that contributed to it, and all local tracks 36. Therefore, given a global ID the fused track 38 has sufficient information to find all local tracks 36 associated it within a sliding temporal window.

Since the local and fused tracks 36, 38 are received by the PTZ controller 120, logic may be developed to control a PTZ camera 12 in a way that is robust to missed target detection and occlusion. The PTZ Controller 120 receives the most recent update to local tracks 36 with minimal latency. However, the local tracks 36 have not been fused and thus do have a global ID assigned by MHT module 62. When the AVM 16 notifies the Tracker node 14 to follow a global ID, the tracker node 14 needs to have a cached fused track with this global ID or wait until the cache is updated with the latest fused track. If the cache already has the global ID, then the PTZ controller 120 may immediately map the global ID to a local track 36 being generated locally and follow the target. Additionally, if the PTZ Controller 120 does not have a local track 36 for the global ID, then it may still follow the target based on the local tracks 36 from other sensors that are contributing to the fused track 38. This eliminates the need for complex logic for hand-off between sensors.

For example, if PTZ A is following a target, and the k-redundancy is greater than one, then at least one secondary PTZ B will also be following the same target. Assuming that MHT module 50 is correctly fusing the local tracks 36 from each sensor, if at any point in time the target becomes occluded from PTZ A, the system 10 will still follow the target since it is receiving fused tracks 38, since PTZ B continues to generate local tracks 36 of the target. This logic takes care of all hand-off from the PTZ cameras 12 and integrates seamlessly with video analytics, GPS, AIS and radar.

Tracker nodes 14 and the AVM 16 have been implemented through the use of computers. The system 10 operates in real-time at a 15 Hz frame rate per camera and scales to hundreds of PTZ cameras on distributed computing hardware. The ACT-vision system 10 has been successfully demonstrated in simulation and true data using the Bosch G3 and G4 PTZ, and Pelco Esprit PTZ cameras. The system 10 has been tested in both in simulation and in the field.

Live testing has been conducted. The system provides uninterrupted tracking through seamless hand-off. Case by case verification of seamless hand-off has been used to measure system performance. The simulator offers significant advantages for system debugging and testing, and performance analysis, since exhaustive real-life testing of such large scale systems is difficult and time consuming.

Figure 10:
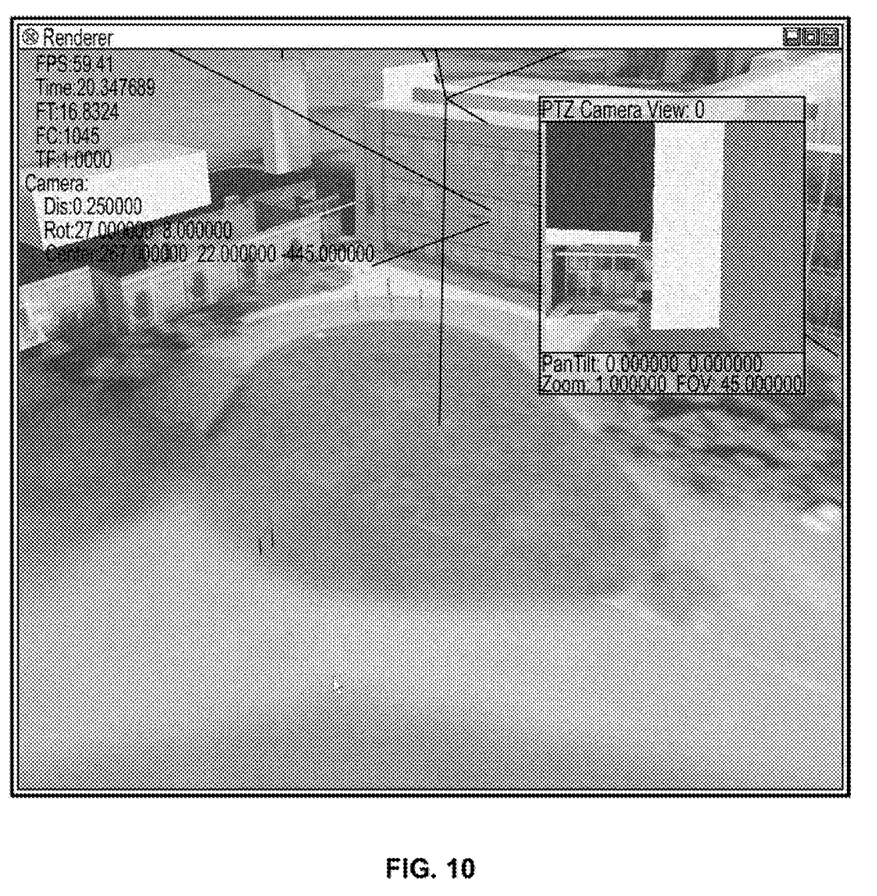
FIG. 10 is an output snapshot produced by a simulation engine built to simulate the ACT-vision system of FIG. 1.

In addition to implemented tracker nodes 14 and the AVM 16, a simulation engine has been built, an output snapshot of which is shown in FIG. 10. The simulation engine was developed in Microsoft DirectX to load a 3D model and emulate a set of ideal PTZ cameras. The virtual PTZ cameras generate a JPEG video stream, PTZ metadata (pan, tilt and zoom), and interpret generic PTZ control commands. A module has also been included to render animated targets such a humans or vehicles with key frame waypoints, orientation and speed parameters for a dynamic scene. The simulation engine supports up to 20 virtual PTZ cameras on a single multi-core PC. The JPEG images are compressed 320×240 RGB images transmitted over a TCP/IP connection to Tracker node clients.

The simulator permits the simulation of a number of user scenarios very quickly and conveniently and thus tests and debugs each component of the system 10. The simulation engine has been used for scalability and longevity testing of the ACT-vision system 10, and also performance and ground truth testing since the absolute position and orientation of scene animations are known in absolute space and time.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A computer-implemented method for coordinated tracking of objects, the method being executed by at least one processor, comprising the steps of:
    receiving a plurality of images from a plurality of nodes;
    identifying at least one target in the plurality of images to produce at least one local track corresponding to each node of the plurality of nodes having the identified at least one target in a field of view of each node;
    fusing the at least one local track corresponding to each node of the plurality of nodes according to a multi-hypothesis tracking method to produce at least one fused track corresponding to the at least one target;
    assigning at least one node of the plurality of nodes to track the at least one target based on minimizing at least one cost function for tracking at least one target for each node of the plurality of nodes; and
    sending the at least one fused track to the at least one node of the plurality of nodes to assigned track the at least one target based on the at least one fused track.

2. The method of claim 1, wherein at least one sensor is assigned per node, wherein minimizing the at least one cost function corresponds to minimizing an N×M cost matrix C, wherein M and N are the number of sensors and the number of targets, respectively, and wherein the cost matrix is minimized using the k-best algorithm to find the best sensor to task assignment, wherein a task represents one target.

3. The method of claim 2, wherein each element of the cost matrix is $C_{ij}=V_{ij}+D_{ij}+O_{ij}+W_{ij}$,
    wherein $V_{ij}$ is a measure between [0,1] indicating whether an associated geographic location of a task j is visible to a sensor i,
    wherein j is greater than or equal to 1 and i is greater than or equal to 2,
    wherein $D_{ij}$ is a measure between [0,1] indicating the cost for the task i to follow a location of the sensor j based on pixels on a target,
    wherein $O_{ij}$ is a measure between [0,1] indicating whether moving objects associated with task j are being observed by sensor i, and
    wherein $W_{ij}$ is measure between [0,1] indicating the cost for sensor i to follow task j.

4. The method of claim 3, wherein minimizing the cost matrix is subject to a constraint of an N×M forbidden matrix, F, wherein the forbidden matrix is based on a sensor state, the sensor state being a binary measure (0 or 1) indicating whether sensor i is available for assignment to follow a task j, wherein the assignment is forbidden.

5. The method of claim 2, further comprising employing a plurality of sensors to observe the same target using a k-redundancy method, wherein k is the maximum number of sensors that are assigned to a task, wherein the k-redundancy method comprises the steps of, for each of the k sensors,
    generating the cost matrix for all untasked sensors in an untasked pool;
    solving the cost matrix using the k-best algorithm; and
    assigning each sensor to its best task and remove the sensors from the untasked pool,
    wherein a task represents one target, and
    wherein number of rows in the cost matrix is reduced for each step less than or equal to the number of tasks.

6. The method of claim 1, wherein the at least one node comprises at least one image capturing device.

7. The method of claim 6, wherein the at least one image capturing device comprises at least one of a pan-tilt-zoom (PTZ) camera, a fixed camera, a GPS device, an AIS device, and a radar-based device.

8. The method of claim 7, wherein the PTZ camera is configured to track more than one target per task.

9. The method of claim 8, wherein the more than one target are grouped into clusters according to the K-means clustering algorithm.

10. The method of claim 9, wherein each of the clusters is labeled as tasks, and wherein the at least one cost function is minimized with clusters substituted for tasks.

11. The method of claim 1, wherein the multi-hypothesis tracking method is the simplified joint probabilistic data association method.

12. A system for coordinated tracking of objects, comprising:
- a plurality of nodes each comprising at least one image capturing device for receiving a plurality of images; and
- at least one processor for:
- receiving the plurality of images from the plurality of nodes;
- identifying at least one target in the plurality of images using to produce at least one local track corresponding to each node of the plurality of nodes having the at least one target in a field of view of each node;
- fusing the at least one local track corresponding to each node of the plurality of nodes according to a multi-hypothesis tracking method to produce at least one fused track corresponding to the at least one target;
- assigning at least one node of the plurality of nodes to track the at least one target based on minimizing at least one cost function for tracking at least one target for each node of the plurality of nodes; and
- sending the at least one fused track to the at least one node of the plurality of nodes assigned to track the at least one target based on the at least one fused track.

13. The system of claim 12, wherein at least one sensor is assigned per node, wherein minimizing the at least one cost function corresponds to minimizing an N×M cost matrix C, wherein M and N are the number of sensors and the number of targets, respectively, and wherein the cost matrix is minimized using the k-best algorithm to find the best sensor to task assignment, wherein a task represents one target.

14. The system of claim 13, wherein each element of the cost matrix is $C_{ij}=V_{ij}+D_{ij}+O_{ij}+W_{ij}$,
- wherein $V_{ij}$ is a measure between [0,1] indicating whether an associated geographic location of a task j is visible to a sensor i,
- wherein j is greater than or equal to 1 and i is greater than or equal to 2,
- wherein $D_{ij}$ is a measure between [0,1] indicating the cost for the task i to follow a location of the sensor j based on pixels on a target,
- wherein $O_{ij}$ is a measure between [0,1] indicating whether moving objects associated with task j are being observed by sensor i, and
- wherein $W_{ij}$ is measure between [0,1] indicating the cost for sensor i to follow task j.

15. The system of claim 14, wherein minimizing the cost matrix is subject to a constraint of an N×M forbidden matrix, F, wherein the forbidden matrix is based on a sensor state, the sensor state being a binary measure (0 or 1) indicating whether node i is available for assignment to follow a task j, wherein the assignment is forbidden.

16. The system of claim 13, further comprising employing a plurality of sensors to observe the same target using a k-redundancy method, wherein k is the maximum number of sensors that are assigned to a task, wherein the k-redundancy method comprises the steps of, for each of the k sensors,
- generating the cost matrix for all untasked sensors in an untasked pool;
- solving the cost matrix using the k-best algorithm; and
- assigning each sensors to its best task and remove the sensors from the untasked pool,
- wherein a task represents one target, and
- wherein number of rows in the cost matrix is reduced for each step less than or equal to the number of tasks.

17. The system of claim 13, wherein the at least one image capturing device comprises at least one of a pan-tilt-zoom (PTZ) camera, a fixed camera, a GPS device, an AIS device, and a radar-based device.

18. The system of claim 17, wherein the PTZ camera is configured to track more than one target per task.

19. The system of claim 18, wherein the more than one target are grouped into clusters according to the K-means clustering algorithm.

20. The system of claim 19, wherein each of the clusters is labeled as tasks, and wherein the at least one cost function is minimized with clusters substituted for tasks.

21. The system of claim 13, wherein the multi-hypothesis tracking method is the simplified joint probabilistic data association method.

22. A computer-readable medium storing computer code for coordinated tracking of objects, the code being executed by at least one processor, wherein the computer code comprises code for:
- receiving a plurality of images from a plurality of nodes;
- identifying at least one target in the plurality of images to produce at least one local track corresponding to each node of the plurality of nodes having the at least one target in a field of view of each node;
- fusing the at least one local track corresponding to each node of the plurality of nodes according to a multi-hypothesis tracking method to produce at least one fused track corresponding to the at least one target;
- assigning at least one node of the plurality of nodes to track the at least one target based on minimizing at least one cost function for tracking at least one target for each node of the plurality of nodes; and
- sending the at least one fused track to the at least one of the plurality of nodes to assigned track the at least one target based on the at least one fused track.

23. The computer readable medium of claim 22, wherein code for minimizing the at least one cost function corresponds to code for minimizing an N×M cost matrix C, wherein M and N are the number of sensors and the number of targets, respectively, and wherein the cost matrix is minimized using the k-best algorithm to find the best sensor to task assignment, wherein a task represents one target.

24. The computer readable medium of claim 23, wherein each element of the cost matrix $C_{ij}=V_{ij}+D_{ij}+O_{ij}+W_{ij}$,
- wherein $V_{ij}$ is a measure between [0,1] indicating whether an associated geographic location of a task j is visible to a sensor i,
- wherein j is greater than or equal to 1 and i is greater than or equal to 2,
- wherein $D_{ij}$ is a measure between [0,1] indicating the cost for the task i to follow a location of the sensor j based on pixels on a target,
- wherein $O_{ij}$ is a measure between [0,1] indicating whether moving objects associated with task j are being observed by sensor i, and
- wherein $W_{ij}$ is measure between [0,1] indicating the cost for sensor i to follow task j.

25. The computer readable medium of claim 4, wherein minimizing the cost matrix is subject to a constraint of an N×M forbidden matrix, F, wherein the forbidden matrix is based on a sensor state, the sensor state being a binary measure (0 or 1) indicating whether sensor i is available for assignment to follow a task j, wherein the assignment is forbidden.

* * * * *